United States Patent [19]
Hecking

[11] Patent Number: 5,436,811
[45] Date of Patent: * Jul. 25, 1995

[54] POLE ASSEMBLY AND METHODS THEREOF

[76] Inventor: Dirck J. Hecking, 5167 Tilly Mill Rd., Dunwoody, Ga. 30338

[*] Notice: The portion of the term of this patent subsequent to Jan. 5, 2010 has been disclaimed.

[21] Appl. No.: 951,900

[22] Filed: Sep. 28, 1992

Related U.S. Application Data

[63] Continuation-in-part of Ser. No. 834,482, Feb. 12, 1992, Pat. No. 5,176,440.

[51] Int. Cl.⁶ .................................................. F21S 1/02
[52] U.S. Cl. ............................... 362/152; 362/249; 362/431; 239/289; 239/279
[58] Field of Search ............... 362/1, 145, 249, 431, 362/152, 253; 239/289, 280, 279; 273/29 R

[56] References Cited

U.S. PATENT DOCUMENTS

| | | | |
|---|---|---|---|
| 414,056 | 2/1979 | Neely | 362/1 |
| 1,787,631 | 1/1931 | Kitzmiller . | |
| 1,794,467 | 3/1931 | Lucas | 362/431 |
| 1,923,085 | 8/1933 | Flick | 194/121 |
| 2,593,517 | 4/1952 | Angulo | 362/96 |
| 3,222,509 | 12/1965 | Thedford | 240/2 |
| 3,865,309 | 2/1975 | Greenhalgh | 239/268 |
| 5,007,587 | 4/1991 | Daroca | 239/289 |
| 5,176,440 | 1/1993 | Hecking | 362/152 |
| 5,207,499 | 5/1993 | Vajda | 362/96 |

FOREIGN PATENT DOCUMENTS

| | | | |
|---|---|---|---|
| 1523095 | 5/1968 | France | 362/431 |
| 2645944 | 10/1990 | France | 362/297 |
| 10699 | 5/1899 | United Kingdom | 362/431 |

*Primary Examiner*—James C. Yeung
*Attorney, Agent, or Firm*—Hopkins & Thomas

[57] ABSTRACT

A light pole assembly is configured to be placed substantially in line with a fence for optimally providing light within the fenced area. For mounting the light pole assembly in close proximity to the fence, the light pole assembly can have a sleeve(s) transversely situated therethrough serving as a passthrough for a horizontal rail of the fence, or a clamping means for clamping the light pole assembly to the fence, or some other mounting mechanism for disposing the light pole assembly near the fence so that the light pole assembly appears substantially in line with the fence. The light pole assembly further comprises an electrical channel for supplying power to a light fixture or some other device disposed at the upper end of the light pole assembly. Moreover, the light pole assembly can have a water path for providing water to a sprinkler to be affixed to the light pole assembly at an elevated location.

2 Claims, 6 Drawing Sheets

POLE ASSEMBLY AND METHODS THEREOF

This is a continuation-in-part of application Ser. No. 07/834,482 entitled "Pole Assembly And Methods Thereof" filed Feb. 12, 1992, U.S. Pat. No. 5,176,440 by Dirck J. Hecking, also the inventor herein.

FIELD OF THE INVENTION

The present invention generally relates to support and maintenance systems for fenced areas, and more particularly, to a light pole assembly for lighting and sprinkler systems for tennis courts and other fenced areas.

BACKGROUND OF THE INVENTION

In the conventional art, lighting systems for tennis courts are generally implemented by positioning light poles having light fixtures around the perimeter of a chain link fence surrounding one or more tennis courts. Typically, the light poles are about thirty feet high or greater. Moreover, attempts are made to adjust the light beam from one or more light fixtures to a particular location on each tennis court so that the entire area of each tennis court is illuminated.

The lighting fixtures on each pole usually require approximately 1000 watts of power from a 110 volt to 440 volt power source. Such a high power consumption is necessary to generate and project sufficient light onto the tennis courts.

These tall light poles are usually constructed from various pieces which can easily be stored, shipped, and handled. A major reason for designing the conventional light poles for easy storage, transportation, and handling is that electricians who install the light poles do not have heavy lift equipment for manipulating large, heavy, light poles.

Another aspect in regard to tennis court support and maintenance involves sprinkler systems. Sprinkler systems are necessary for frequently dampening clay, crushed stone, or grass on the playing surface of tennis courts. These types of court surfaces require water for grooming as often as four times a day. Traditionally, tennis courts have been dampened by using numerous sprinklers which are situated on the ground. Because of the surrounding fence, sprinklers are generally placed within the fenced area so that the chain link fence does not block the necessary and proper sprinkler spray pattern. Moreover, the sprinklers are slightly spaced from the fence around the inner perimeter so that the sprinklers can rotate around in angular motion without interference from the fence.

The sprinklers usually comprise a spraying apparatus which is fixed into a water outlet in the ground. The water outlet often is merely a pipe nipple rising out of the ground from a water pipe network connected remotely to a water source.

Although the lighting and sprinkler support systems for tennis courts have thus far been adequate, they are problematic, burdensome, unsightly, makeshift, and inefficient. The lighting systems do not optimally light the tennis courts during the night. Dark areas undesirably reside on the courts between the lighted areas illuminated by the light poles. Also, gangs of light fixtures on light poles can create bright spots, or hot spots, on the playing surface. These dark and light areas make playing the tennis game less pleasant and tiring to the eyes.

Moreover, much of the light projected from the light poles onto the tennis courts is wasted. Because of the huge distance from the light fixtures to the tennis courts, light is dissipated via attenuation. In addition, light cannot be precisely focused at these great distances, and therefore, light is projected out of bounds, i.e., outside the fenced area, thereby flooding the surrounding neighborhood and/or the tennis courts which are not active. Many communities have light pollution restrictions which prohibit such stray light.

Other problems with the lighting systems are associated with the placement and construction of the light poles. The light poles must be placed even further away and much higher from a fenced area if a sidewalk, viewing areas, or landscaping abuts or is in close proximity to the fence. Light poles must also be spaced far from a fenced area when a power line passes over the fenced area due to applicable electrical codes which require a certain spacing between the power line and structures protruding upwardly from the ground. An inadequate spacing could cause hazardous arcing of electrical charge from the power line to the protruding structure. Further, because of the piece-wise construction of the light poles, the light poles are not aesthetically appealing. Finally, winds can induce twisting moment on the light poles, thereby causing destruction of the light poles and potential property damage and/or injury to life.

Existing sprinkler systems for fenced-in tennis courts also need improvement. When clay or crushed stone tennis courts are "dragged," or groomed (e.g., broomed and rolled) by a tractor or some other similar means, the sprinklers and/or the water outlet itself is frequently damaged, destroyed, or clogged by debris.

A need exists in the art for better support and maintenance systems, particularly lighting and sprinkler systems, for tennis courts and other fenced areas.

SUMMARY OF THE INVENTION

The present invention is a system for providing light and/or water within an area surrounded by a fence. For instance, an area containing one or more tennis courts. In accordance with the present invention, a novel pole assembly is adapted to be positioned in close proximity to the fence and substantially in line with the fence in order to optimally provide light and/or water within the fenced area, as hereafter described.

The light pole assembly has an elongate body, or pole, with a base end and a light fixture end. The base end is adapted to be mounted in the ground. The light fixture end is adapted to receive a light fixture to be mounted far above said fence. A mounting means is provided for mounting the elongate body in close proximity to the fence so that the pole assembly is substantially in line with the fence. The mounting means could be any of a variety of mechanisms as will be described hereinafter relative to preferred embodiments.

An electrical path means can be disposed in the pole assembly to provide electrical power to the light fixture(s). The electrical path means can have an electrical supply inlet situated at the base end of the elongate body. An electrical channel through the length of the elongate body provides a throughway for electrical wires. Finally, an electrical outlet is provided at the fixture end to permit connection of the electrical wires with one or more light fixtures.

A sprinkler path means can be disposed in the pole assembly. The sprinkler path means has a sprinkler supply inlet situated at the base end of the elongate body. A sprinkler channel is disposed through the elongate body. Moreover, a sprinkler outlet is situated along the elongate body somewhere above the ground. The sprinkler outlet is adapted to accept connection of a water sprinkler.

In a first embodiment of the present invention, the elongate body has an internal sleeve transversely situated therethrough. A horizontal fence rail of the fence is inserted through the internal sleeve so that the pole assembly becomes part of the fence. Because of the sleeve which is affixed transversely through the cylindrical pipe of the light pole assembly, the light pole assembly is substantially strengthened. Instead of a soft point in the light pole assembly, the passthrough becomes a hard (support) point.

In second and third embodiments of the present invention, the elongate body is clamped to the fence or in close proximity to the fence by a clamping means, so that the pole assembly appears substantially in line with the fence. These embodiments are considered cost effective and are easily implemented.

In a fourth embodiment of the present invention, the elongate body is welded to either side of the fence or is welded in close proximity to the fence so that the pole assembly appears substantially in line with the fence. This is also considered a cost effective embodiment and is easily implemented.

The present invention, including but not limited to the previously described exemplary embodiments, overcomes the deficiencies of the prior art as described in the background section, and further provides for the following additional features and advantages.

Another advantage of the present invention is that the light pole assembly provides for optimal lighting within a fenced area. Hot spots and dim areas are minimized, thereby enhancing the appeal of the playing area. Further, because of better lighting efficiency, light bulbs with lesser power demands may be utilized to accomplish optimal lighting.

Another advantage of the present invention is that the light pole assembly becomes an integral part of the fence. As a result, the light pole assembly and the fence promote the stability of each other. The combination of the light pole assembly and fence inhibits the twisting moment of any winds.

Another advantage of the present invention is that the light pole assembly is aesthetically pleasing in that it becomes an integral part of the fence and eliminates obstacles to onlookers situated at the outer periphery of the fence.

Another advantage of the present invention is that with the preferred single-piece construction of the light pole assembly, the stability of the light pole assembly is substantially enhanced in the presence of high winds.

Another advantage of the present invention is that because the light pole assembly can be affixed to the fence which is grounded, the light pole assembly can also be easily grounded in the presence of an overhead power line so as to abide by applicable government electrical rules and regulations.

Another advantage of the present invention is that any commercially available light fixture may be connected to the flange(s) provided at the elevated end of each light pole assembly. It is further envisioned that video cameras, surveillance apparatus, or other equipment may be mounted to the flange. Flange adapters increase the utility by enabling any manufacturer's equipment to be used.

Another advantage of the present invention is that the light pole assembly is configured so that it can easily be handled by two men. Moreover, erection can take less than ten minutes.

Another advantage of the present invention is that a fence contractor can install the light pole assembly using ordinary fence equipment. Moreover, fence contractors are much cheaper than electrical contractors. Hence, the cost of installing the light post assemblies in accordance with the present invention is substantially less than installing light towers around the outer periphery of the fence.

Another advantage of the present invention is that the light pole assembly can be implemented before a fence is installed, during the installation of the fence, or after a fence has been installed by retrofitting the light pole assembly into the existing fence.

Another advantage of the present invention is that it provides for implementing a sprinkler system for supplying water to the fenced area. This concept has particular application to clay and crushed stone tennis courts, which must be watered down many times a day. In addition, because sprinklers can be positioned far above ground, the sprinklers can cover more territory and are not damaged by tractors which groom the tennis courts.

Further features and advantages of the present invention will become apparent to one of skill in the art upon examination of the following drawings and text. It is intended that any additional features and advantages be incorporated herein.

BRIEF DESCRIPTION OF THE DRAWINGS

The present invention, as defined in the claims, can be better understood with reference to the following drawings. The drawings are not necessarily to scale, emphasis instead being placed upon clearly illustrating principles of the present invention.

DETAILED DESCRIPTION OF THE PREFERRED EMBODIMENTS

Figure 1:
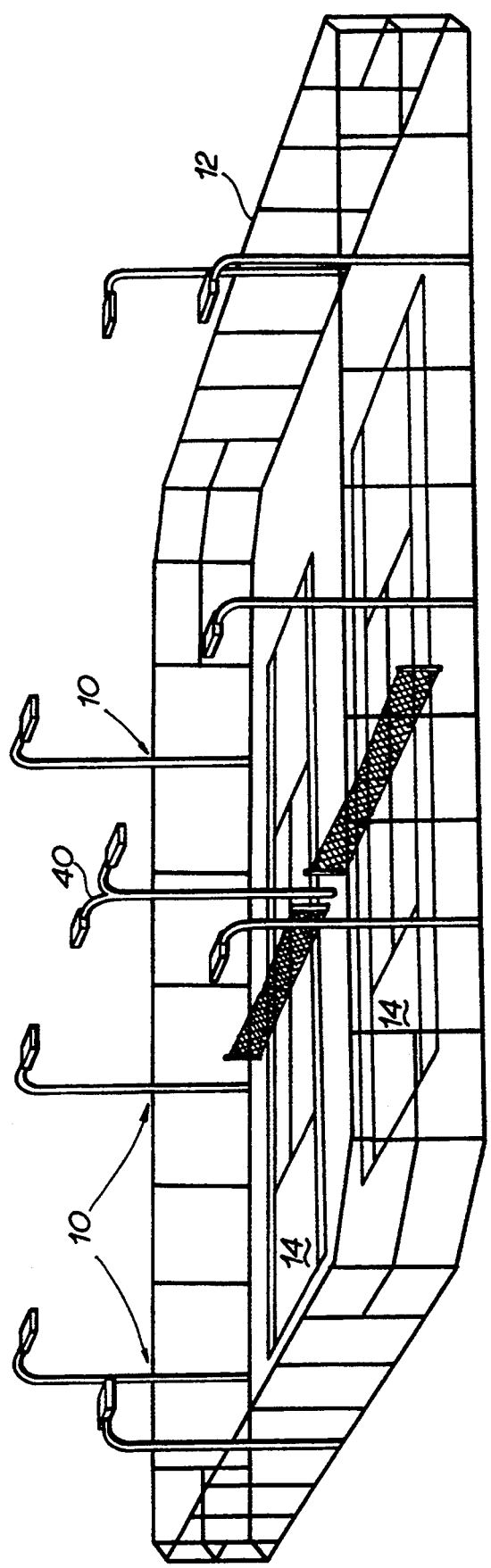
FIG. 1 shows a perspective view of a fenced area having light post assemblies disposed in line with a fence in accordance with the present invention.

As shown in FIG. 1 by way of example, light post assemblies 10 are situated in close proximity to and substantially in line with a fence 12 so as to provide efficient and optimal lighting and/or water to a fenced area 14, having one or more tennis courts. Because of the close proximity of the lights to the tennis courts, no hot spots or dark patches exist on the courts, and the courts can be lighted adequately with less power consumption. Moreover, because the light post assemblies 10 are integrated into the fence 12, a unitary strong combination results. Consequently, the light pole assemblies 10 and the fence 12 promote the stability of each other, and the combination inhibits the twisting moment of any winds.

Figure 2:
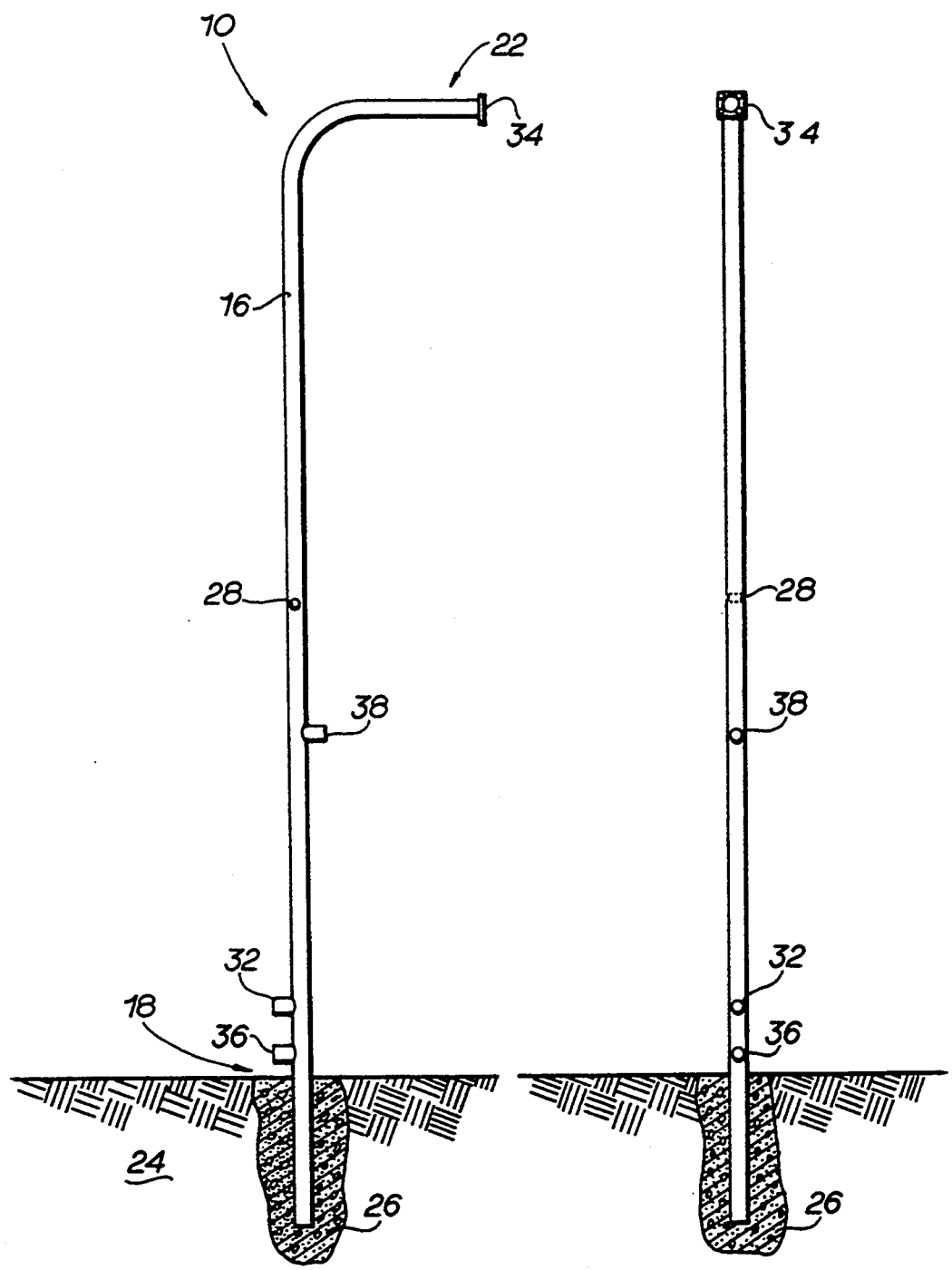
FIG. 2 shows a side view of an example of a light pole assembly in accordance with the present invention.

FIG. 2 shows a light pole assembly 10 in accordance with the present invention for supporting a light fixture. The light pole assembly 10 has an elongate body 16 with a base end 18 and a light fixture end 22. Preferably, the elongate body 16 is a one-piece cylindrical pipe. However, obviously, the elongate body 16 may take a variety of forms. For example, it can be in the form of multi-piece construction. Further, the elongate body 16 may have a plurality of side faces. For instance, the elongate body 16 may be a square pole which has four side faces.

It should further be emphasized that many other configurations are possible for the light fixture end 22 of the elongate body 16. For example, the light fixture end may have a "Y", "T", "quad", or "stub" configuration for disposing more than one light over the fenced area 14. These configurations are described in parent application Ser. No. 07, 834,482 entitled "Pole Assembly And Methods Thereof" filed Feb. 12, 1992 by Dirck J. Hecking, the disclosure of which is incorporated herein by reference as if set forth in full hereinbelow.

With reference to FIG. 2, in the preferred embodiment, the elongate body 16 is made of steel, fiberglass, or some other strong material which is about 1/16 to ⅛ of an inch in thickness. Further, the elongate body 16 is approximately 4 inches in outside diameter (OD). If steel is utilized, it should not be galvanized so that it can be painted.

The base end 18 of the elongate body 16 is mounted in the ground 24 via cement or some other suitable bonding material 26. In the preferred embodiment, the base end 18 of the light pole assembly 10 extends into the ground three feet. The light pole assembly 10 linearly rises eighteen feet from the ground to a point where it gradually bends in an L-shaped pattern. The rise of the bend is two feet and the extension of the bend into the fenced area 14 is three feet. It is preferable to have either a 80° or 90° bend.

The light pole assembly 10 has an electrical path for providing electrical power to the flange 22, where a light fixture is to be disposed. An electrical supply inlet 32 is provided to permit entry of electrical wires. The inlet 32 can be merely a hole or a commercially available pipe nipple of any appropriate size. An electrical junction box may be placed around the nipple 32. Moreover, the elongate body 16 is hollow to permit the electrical wires to transgress to an electrical outlet 34, which is surrounded by the flange 22. The electrical wires passing through the elongate body 16 may be enclosed in conduit. Further, the outlet 34 can be a hole or a pipe nipple allowing passage of the electrical wires to an external light fixture.

The light pole assembly 10 can also be equipped with a sprinkler path for providing water to the fenced area 14. A sprinkler supply inlet 36 is disposed at the base end 18 of the light pole assembly 10. The inlet 36 is a pipe nipple or similar water interfacing device in the preferred embodiment. A pipe or hose situated internally to the elongate body 16 connects the sprinkler 36 to a sprinkler outlet 38. A sprinkler or other water dispensing/spraying means is affixed to the sprinkler outlet 38 in order to spray water within the fenced area 14.

Worth noting is that the sprinkler outlet 38 is positioned far above ground. Consequently, a sprinkler can spray more area than conventional designs and will not be damaged during grooming of the fenced area 14. In most tennis court designs, the sprinklers usually positioned in the center of the fenced area 14 can be eliminated due to the enhanced efficiency of the sprinklers in accordance with the present invention.

Figure 3A:
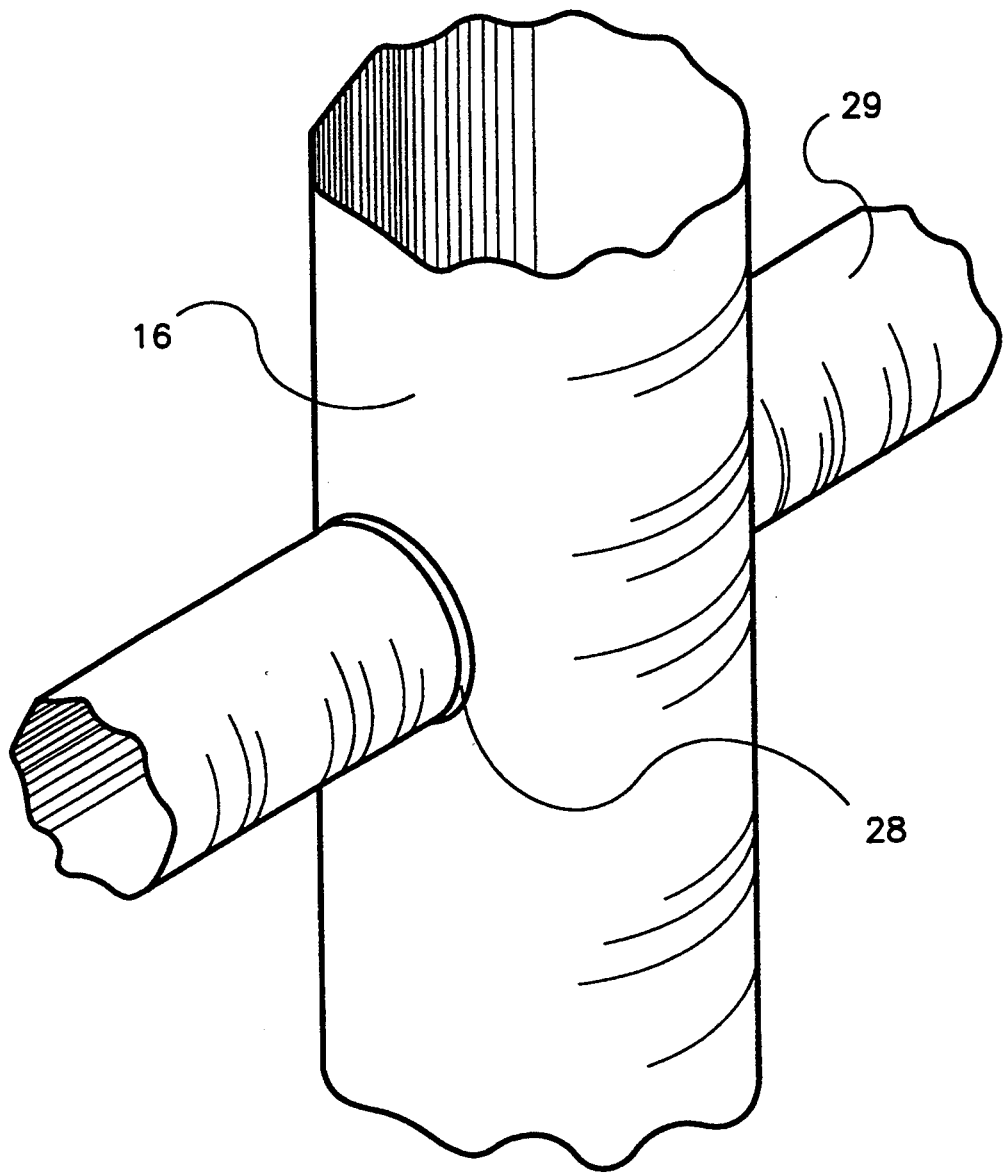
FIG. 3A shows a perspective view of a mounting means in accordance with a first embodiment of the present invention.

In a first embodiment of the present invention, as illustrated in FIG. 3A, an internal sleeve 28 is welded into the center of the elongate body 16 so as to provide a "passthrough" for any horizontal rail 29, such as a top rail, midrail, or other rail, or one or more of the foregoing, of the fence 12. In the preferred embodiment, the horizontal rail 29 is the top rail of the fence 12. The internal sleeve 28 provides a point of support for the light pole assembly 10. Furthermore, the internal sleeve 28 enables the light pole assembly 10 to be placed substantially in line with the fence 12.

In the preferred embodiment, the internal sleeve 28 is made from 12 gauge steel (about 1/16 inch) and has an inside diameter (ID) of 1¾ to 2 inches. Typically, the horizontal fence rail is approximately 1⅝ inches OD. Hence, the horizontal fence rail will easily slide through the internal sleeve 28 during installation of the light pole assembly 10. It is desirable to have a snug fit between the internal sleeve 28 and the horizontal fence rail 29 so as to decrease relative movement and wear.

Figure 3B:
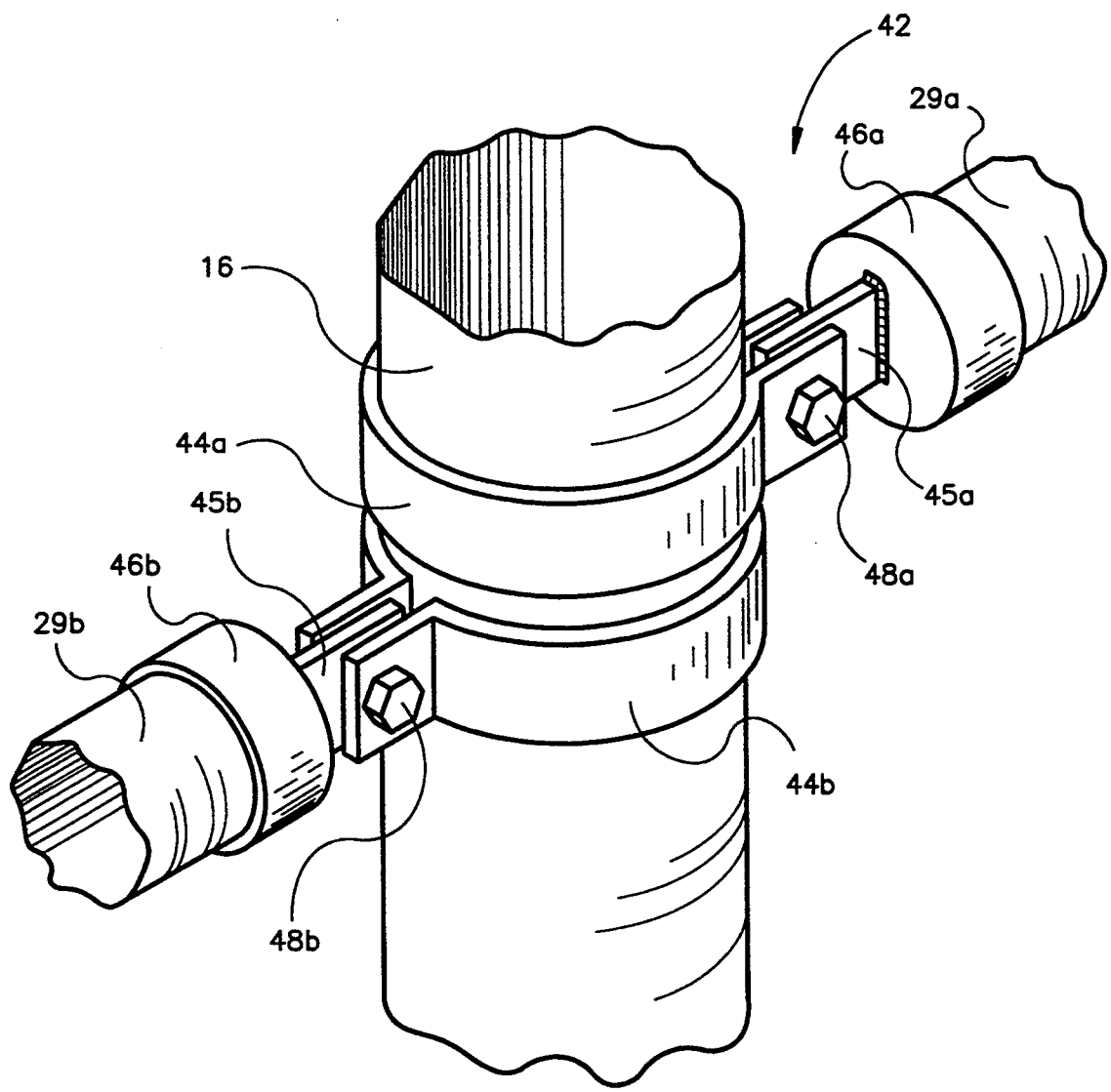
FIG. 3B shows a perspective view of a mounting means in accordance with a second embodiment of the present invention.

In second and third embodiments of the present invention, as described relative to respective FIGS. 3B and 3C hereinafter, a clamping means 42 is employed to situate the elongate body 16 of the light pole assembly 10 substantially in line with the horizontal rail 29 of the fence 12. In the second embodiment, as shown in FIG. 3B, the clamping means 42 has two metal C-clamps, a top C-clamp 44a and a bottom C-clamp 44b, connecting the light pole assembly 10 to a portion 29a of the fence horizontal rail 29 and to another opposing portion 29b of the fence horizontal rail 29. The top and bottom C-clamps 44a, 44b are connected respectively to offset protruding members 45a, 45b of corresponding rail end caps 46a, 46b. The rail end caps 46a, 46b are situated at the ends of respective horizontal rail portions 29a, 29b via corresponding nut and bolt arrangements 48a, 48b, or some other suitable affixing mechanism.

Figure 3C:
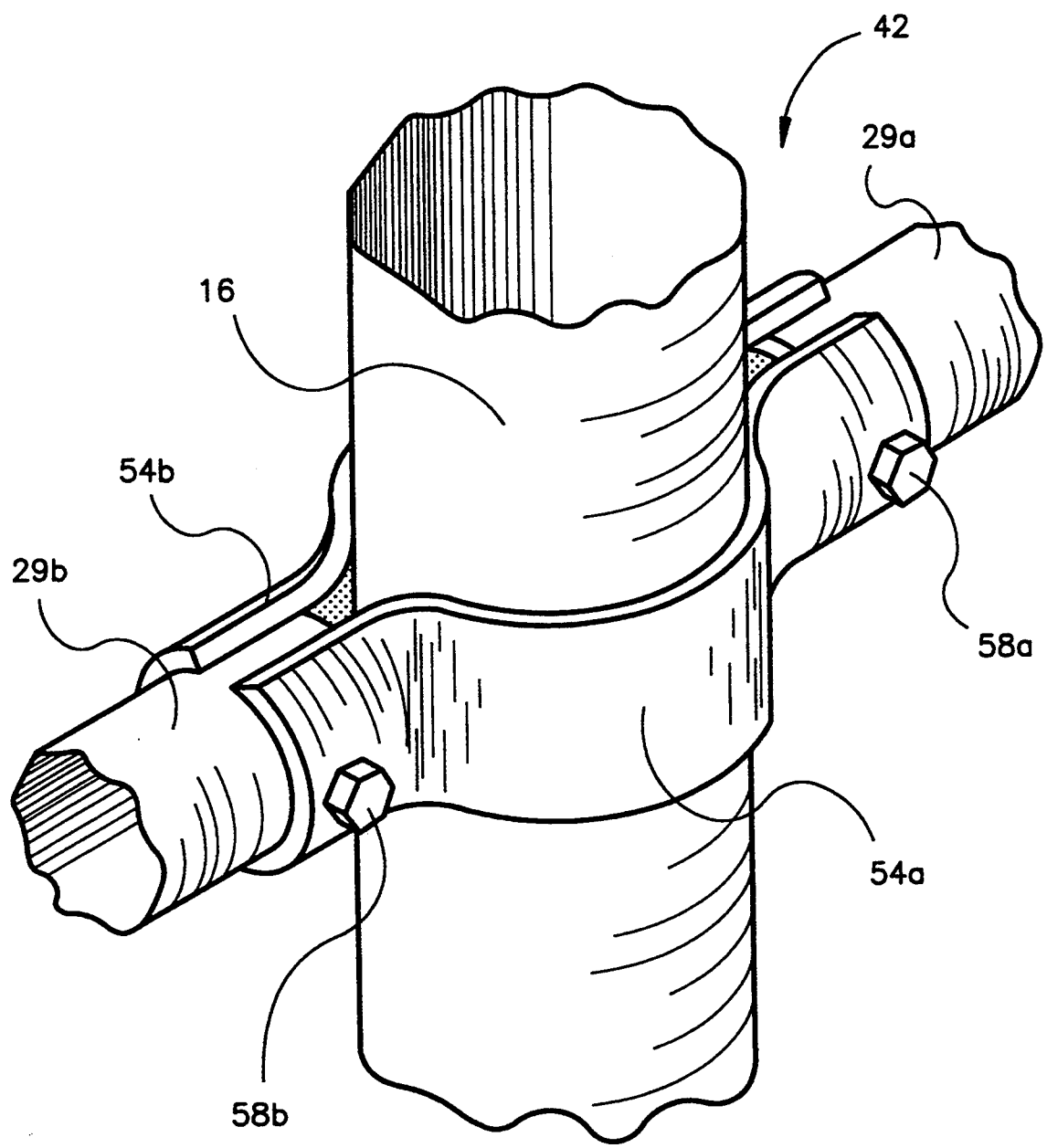
FIG. 3C shows a perspective view of a mounting means in accordance with a third embodiment of the present invention.

In the third embodiment, as shown in FIG. 3C, the clamping means 42 has two metal side clamps 54a, 54b, connecting the light pole assembly 10 to a portion 29a of the fence horizontal rail 29 and to another opposing portion 29b of the fence horizontal rail 29. The side clamps 54a, 54b are both connected to the ends of respective horizontal rail portions 29a, 29b via corresponding nut and bolt arrangements 58a, 58b, or some other suitable affixing mechanism.

Figure 3D:
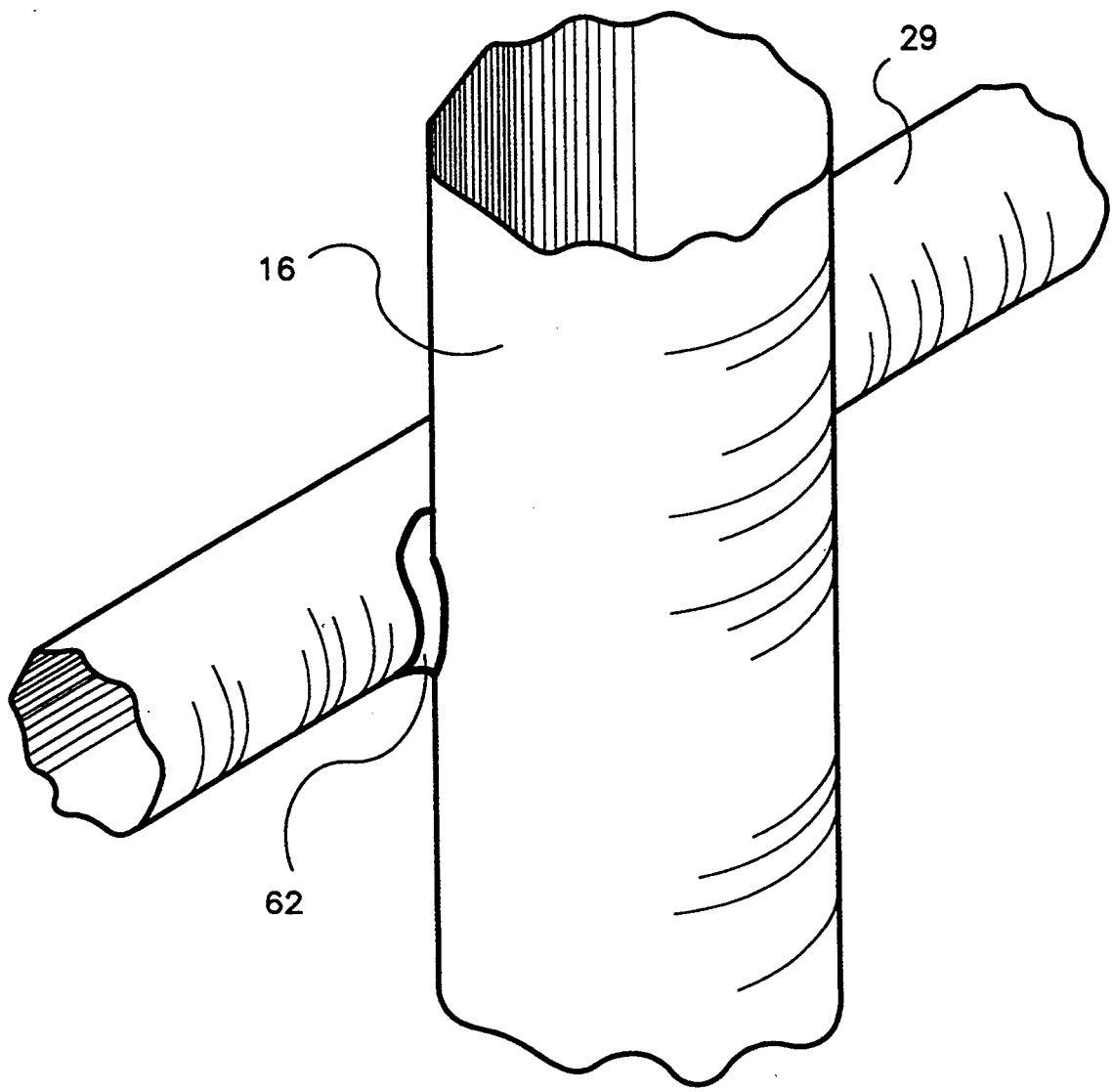
FIG. 3D shows a perspective view of a mounting means in accordance with a fourth embodiment of the present invention.

In a fourth embodiment of the present invention, as shown in FIG. 3D, the elongate body 16 of the light pole assembly 10 is situated in close proximity to and substantially in line with the fence 12 by bonding the elongate body 16 to the horizontal rail 29 of the fence 12. Bonding can be by any conventional means. In the preferred embodiment, the elongate body 12 is welded by a weld 62 to the horizontal rail 29, as illustrated by way of example in FIG. 3D. The elongate body 12 can be mounted inside or outside of the fenced area 14. Moreover, the elongate body 12 need not be bonded directly to the rail 29. One or more members may be interposed between the body 12 and rail 29 in a fixed relationship to provide the necessary support.

Worth noting is that in the preferred embodiments the bonding material 26 (e.g., cement) is generally an insulator which insulates the light pole assembly 10 from the ground 24. However, because the light pole assembly 10 can be affixed to the fence 12 which is grounded via its meshing, the light pole assembly 10 can also be easily grounded in the presence of an overhead power line so as to abide by applicable government electrical rules and regulations.

Those persons skilled in the art will readily appreciate the many modifications that are possible relative to the preferred embodiments without materially departing from the novel teachings and principles of the present invention. All such modifications are intended to be included in the scope of the present invention, as defined in the following claims.

Wherefore, the inventor claims the following:

1. A light pole assembly for optimally providing light and water within a fenced area surrounded by a fence, comprising:
   a pole having a base end and a light fixture end, said pole for mounting in the ground and for disposing a light fixture above said fence, said light fixture end having an L-shaped bend leading to a flange for mounting said light fixture;
   mounting means for mounting said pole in close proximity to said fence so that said pole is substantially in line with said fence, said mounting means comprising a C-shaped clamp secured around said pole and connected to an adjacent horizontal rail of said fence, said C-shaped clamp having a bolt aperture at each of its ends, said rail having an end cap with a protruding member, said protruding member having a hole at a distal end, said apertures and said hole being aligned, said mounting means further comprising a bolt passing through said hole and apertures;
   an electrical path means having an electrical inlet situated at said base end of said pole, an electrical outlet at said flange, and an electrical channel through said pole connecting said electrical inlet and outlet; and
   a sprinkler path means having a sprinkler supply inlet situated on said pole, a sprinkler outlet situated along said pole and adapted to accept connection of a water sprinkler, and a sprinkler channel through said pole connecting said sprinkler supply inlet and outlet.

2. The light pole assembly of claim 1, further comprising another horizontal rail connected to said pole via another C-shaped clamp secured around said pole and connected to said another horizontal rail.

* * * * *